Patented Aug. 30, 1932                                    1,874,177

UNITED STATES PATENT OFFICE

GEORGE HOLLAND ELLIS, OF SPONDON, NEAR DERBY, ENGLAND, ASSIGNOR TO CELANESE CORPORATION OF AMERICA, A CORPORATION OF DELAWARE

TREATMENT OF MATERIALS MADE OF OR CONTAINING CELLULOSE DERIVATIVES

No Drawing. Application filed October 26, 1928, Serial No. 315,345, and in Great Britain November 28, 1927.

This invention relates to the treatment of yarns, threads, knitted or woven fabrics or other materials made of or containing cellulose acetate or other organic acid esters of cellulose for example cellulose formate, propionate or butyrate or the products obtained by the treatment of alkalized cellulose with sulpho-chlorides, e. g. the product known as "immunized cotton" obtained from cotton and p-toluene sulpho-chloride, or made of or containing cellulose ethers, such for instance as methyl, ethyl or benzyl cellulose or the corresponding condensation products of cellulose and glycols or other polyhydric alcohols, all of which cellulose derivatives are hereinafter referred to as organic substitution derivatives of cellulose.

According to the present invention materials made of or containing cellulose acetate or other organic substitution derivatives of cellulose are treated with alkaline solutions of zinc, solutions of sodium or potassium zincates being very suitable.

Materials treated according to the present invention are found to have absorbed a considerable proportion of metallic radicle most probably as zinc oxide which is presumably in a hydrated form and to have acquired an increased resistance to hot treatments such as ironing.

The greatest advantage accruing from the present invention, more especially with materials made of or containing cellulose esters, is that the materials treated exhibit an affinity for a very wide variety of coloring matters. Thus not only do cellulose ester materials so treated retain their affinity for basic colors and for the insoluble colors especially devised for application thereto and usually applied as such in solubilized or dispersed form, e. g. the "S. R. A. colors", but they also exhibit an affinity for the direct cotton colors, for mordant colors both synthetic and natural, and for the indigoid and anthraquinone vat colors.

The process of the present invention may be carried out at any suitable temperature, hot or cold, and with any suitable concentration of the alkaline solutions. The process may be conducted continuously by mechanical impregnation, the materials being then allowed time to absorb the necessary quantity of alkaline solution, or it may be carried out by a simple immersion in the bath or by any other suitable method. The immersion method appears to give the best results.

Absorption of the alkaline solutions may be assisted by addition of swelling agents for the cellulose derivatives, for example thiocyanates, particularly of the alkali metals or ammonium.

It is further found that the treatment of the materials with alkaline solutions of zinc enables the production thereon of discharge effects, which hitherto have been difficult of attainment on these materials. The invention accordingly further comprises the production of discharge effects on materials made of or containing cellulose acetate or other organic substitution derivatives of cellulose treated with alkaline solutions of zinc, for example alkali zincates, either by dyeing, printing or otherwise coloring with dischargeable dyestuffs and subsequently applying discharges as required, or by applying discharges at selected places and subsequently dyeing or otherwise coloring with the dischargeable dyestuffs. Colored discharges may be employed containing undischargeable colors.

The discharges employed may be the ordinary reduction discharges, for example formaldehyde-sulphoxylate or formaldehyde-hydrosulphite or the like, or they may be oxidation discharges, for example the chlorate discharges, used with or without accelerators or catalysts, for example salts of iron or vanadium. In the case of discharging vat and sulphur colors, the reduction discharges may be applied together with leucotropic bodies, that is to say substances capable of combining with the leuco compound of the dyestuff forming a soluble or more soluble body and thereby facilitating washing out.

The simple reduction discharges may be applied, for example, for discharging direct cotton dyestuffs or insoluble dischargeable azo dyestuffs which have been applied in dispersed form. Together with the leucotropic bodies referred to above they may be applied for discharging indigoid and anthraquinone vat colors and sulphur colors. The oxidation discharges, for instance chlorates, may be applied for the discharge of di- and tri-aryl methane, thiazine, oxazine (including gallocyanines) azine, azo, xanthene and indigoid dyestuffs, as well as many of the insoluble dyestuffs which are applied in the dispersed form.

The dyestuffs and the discharges (whether applied before or after the dyestuffs) may be applied by any suitable dyeing, printing, stencilling or other method.

In addition to being applicable to materials made entirely of cellulose esters and ethers, the processes of the present invention may also be applied to mixed goods containing such cellulose derivatives in association with other fibres or materials not deleteriously or substantially affected by the alkaline solutions employed, for example with cotton or with artificial cellulosic fibres, such for instance as viscose and cuprammonium artificial silks. Furthermore effects may be obtained by weaving, knitting or otherwise making up yarns or threads, containing organic substitution derivatives of cellulose which have been treated with alkaline solutions of zinc, with other yarns or threads, for example wool or silk which may be deleteriously affected by the alkaline solutions, and thereafter dyeing with or without discharging.

The following examples are illustrative of the processes of the invention, but are not to be regarded as limiting it.

Example 1

Cellulose acetate woven fabric is immersed for 1 hour in a cold solution containing 50 grams per litre of sodium zincate of composition zinc 24.23% sodium 35.06%. The goods are then lifted carefully, rinsed, and given a light soaping for 15 minutes in ¼% soap solution at 45° C. The fabric so treated is distinguished by its greater resistance to ironing than that of the untreated fabric; and by its affinity for basic, mordant, acid and direct cotton dyestuffs.

Example 2

Cellulose acetate woven fabric is passed continuously through a pad mangle or other suitable machine containing a solution of 200 grams per litre of sodium zincate of analysis given in Example 1; the bath temperature being 25° C. After batching for 3 hours, the fabric is washed thoroughly in cold water, soaped in ¼% soap solution for 15 minutes at 45° C. rinsed well and dried or otherwise treated as desired. The fabric is similar to that treated according to Example 1.

Example 3

A fabric composed of cellulose acetate yarn, after treating with alkaline zincate according to the above examples, is dyed with 1% of its weight of Chlorazol Violet R. (Colour Index 388). The material is then dried and further prepared for printing as desired. It is then printed by roller printing machine or hand-block with a printing paste composed as follows:—

540 grams gum arabic 1:1
180 grams Caledon Jade Green paste (Colour Index 1101).
36 grams sodium hydrosulphite
36 grams caustic soda
120 grams anthraquinone 10% paste
108 grams methylated spirit
  Heat to reduce, cool partly and add:—
180 grams formosul (sodium formaldehyde sulphoxylate)

1200

After printing, the material is dried and steamed in the "cottage" steamer for 3 to 4 minutes with steam at 5 lbs. pressure, or alternatively given a passage through the "rapid ager" at 100° C. after which it is given a treatment for 5 minutes at 60° C. in an oxidizing bath composed of:—

1 gram per litre sodium perborate.
1 gram per litre soap.

After oxidation the fabric is washed, soaped and otherwise treated and finished as desired or requisite.

Example 4

A fabric composed of cellulose acetate yarns, which has been treated with alkaline zincate according to Examples 1 or 2 above is dyed with 0.5% of its weight of 4-nitro-2-methoxybenzene-azo-diethylaniline, after which the material is dried and further finished for printing as desired. It is then printed on a roller printing machine or by hand-block with the following printing paste.

720 grams gum arabic 1:1
120 grams anthraquinone 10% paste
60 grams zinc oxide
100 grams water
200 grams formosul (sodium formaldehyde sulphoxylate)

1200

After printing, the fabric is dried and steamed in the "cottage" steamer for 5 to 7 minutes with steam at 5 lbs. pressure or given one or two passages through the "rapid ager" at 100° C. The material is then washed, soaped and otherwise treated and finished as desired or requisite.

Example 5

A fabric composed of cellulose acetate yarn, after treatment with alkaline zincate according to Examples 1 or 2 above is printed on a roller printing machine or by hand-block with a paste consisting of:—

180 grams leucotrope O (dimethylphenyl-ammonium chloride).
1020 grams British gum thickening.

1200

After printing, the material is dried and again printed, using a cover roller, with an anthraquinone vat color paste as follows:

624 grams gum arabic 1:1.
240 grams Caledon red BN. paste (Colour Index 1162).
36 grams caustic soda.
60 grams Turkey red oil.
60 grams methylated spirit.
36 grams sodium hydrosulphite.
Heat up to reduce, cool and add:—
144 grams formosul (sodium formaldehyde sulphoxylate) 1:1.

1200

After printing, the material is given a passage through the "rapid ager" at 100° C. or alternatively given an equivalent steaming of about 4 minutes in the "cottage" steamer at 5 lbs. pressure, after which it is oxidized in a 5 gram per litre solution of sodium dichromate for 5 minutes at 60° C. It is then washed, soaped and otherwise treated and finished as desired or requisite.

In a similar manner materials containing other cellulose esters, for example cellulose formate or cellulose propionate, or immunized cotton, or materials containing cellulose ethers, for instance methyl, ethyl, or benzyl cellulose, may be treated to obtain similar effects.

What I claim and desire to secure by Letters Patent is:—

1. Process for the treatment of materials comprising organic substitution derivatives of cellulose, comprising treating the materials with alkaline solutions of zinc.

2. Process for the treatment of materials comprising organic substitution derivatives of cellulose, comprising treating the materials with alkaline solutions of zinc and thereafter coloring the materials.

3. Process for the treatment of materials comprising cellulose esters, comprising treating the materials with solutions of alkali metal zincates.

4. Process for the treatment of materials comprising cellulose esters, comprising treating the materials with solutions of alkali metal zincates and thereafter coloring the materials.

5. Process for the treatment of materials comprising cellulose esters, comprising treating the materials with solutions of alkali metal zincates and thereafter coloring the materials with dyestuffs normally applied to cotton.

6. Process for the treatment of materials comprising cellulose esters, comprising treating the materials with solutions of alkali metal zincates and thereafter locally coloring the materials by applying separately both discharges and dischargeable dyestuffs.

7. Process for the treatment of materials comprising cellulose acetate, comprising treating the materials with solutions of alkali metal zincates.

8. Process for the treatment of materials comprising cellulose acetate, comprising treating the materials with solutions of alkali metal zincates and thereafter coloring the materials.

9. Process for the treatment of materials comprising cellulose acetate, comprising treating the materials with solutions of alkali metal zincates and thereafter coloring the materials with dyestuffs normally applied to cotton.

10. Process for the treatment of materials comprising cellulose acetate, comprising treating the materials with solutions of alkali metal zincates and thereafter locally coloring the materials by applying separately both discharges and dischargeable dyestuffs.

11. Process for the treatment of materials comprising cellulose acetate, comprising treating the materials with solutions of alkali metal zincates and thereafter locally coloring the materials by applying separately both discharges and dischargeable dyestuffs normally applied to cotton.

12. Process for the treatment of materials comprising cellulose acetate, comprising treating the materials with solutions of alkali metal zincates and thereafter locally coloring the materials by uniformly coloring with dischargeable dyestuffs and thereafter locally applying discharges.

13. Process for the treatment of materials comprising cellulose acetate, comprising treating the materials with solutions of alkali metal zincates and thereafter locally coloring the materials by uniformly coloring with dischargeable dyestuffs and thereafter locally applying colored discharges.

14. Process for the treatment of materials comprising cellulose acetate, comprising treating the materials with solutions of alkali metal zincates and thereafter locally coloring the materials by uniformly coloring with dischargeable dyestuffs and thereafter locally applying reduction discharges.

15. Process for the treatment of materials comprising cellulose acetate, comprising treating the materials with solutions of alkali metal zincates and thereafter locally coloring the materials by uniformly coloring with dischargeable dyestuffs and thereafter locally applying colored reduction discharges.

16. Partially saponified materials comprising cellulose esters and containing zinc oxide.

17. Partially saponified colored materials comprising cellulose esters and containing zinc oxide.

18. Partially saponified materials comprising cellulose acetate and containing zinc oxide.

19. Partially saponified colored materials comprising cellulose acetate and containing zinc oxide.

In testimony whereof I have hereunto subscribed my name.

GEORGE HOLLAND ELLIS.